United States Patent [19]
Hatfield

[11] Patent Number: 5,343,508
[45] Date of Patent: Aug. 30, 1994

[54] SPACER GRID RETAINER

[75] Inventor: Stephen C. Hatfield, Granby, Conn.

[73] Assignee: Combustion Engineering, Inc., Conn.

[21] Appl. No.: 951,853

[22] Filed: Sep. 28, 1992

[51] Int. Cl.$^5$ .............................................. G21C 3/32
[52] U.S. Cl. ................................................... 376/449
[58] Field of Search ............... 376/260, 261, 353, 446, 376/449

[56] References Cited

U.S. PATENT DOCUMENTS

| | | | |
|---|---|---|---|
| 3,791,466 | 2/1974 | Patterson et al. | 376/449 |
| 3,920,516 | 11/1975 | Kmonk et al. | 376/441 |
| 3,954,560 | 5/1976 | Delafosse et al. | 376/446 |
| 4,240,876 | 12/1980 | Delafosse | 376/434 |
| 4,323,428 | 4/1982 | Schallenberger | 376/353 |
| 4,389,369 | 6/1983 | Bryan | 376/442 |
| 4,692,303 | 9/1987 | Osborne | 376/446 |
| 4,879,090 | 11/1989 | Perrotti et al. | 376/442 |
| 5,024,807 | 6/1991 | Hatfield et al. | 376/442 |
| 5,200,143 | 4/1993 | Johansson | 376/449 |

FOREIGN PATENT DOCUMENTS

| | | |
|---|---|---|
| 0175496 | 3/1986 | European Pat. Off. |
| 0508440 | 10/1992 | European Pat. Off. |
| 2200586 | 4/1974 | France |
| 2390804 | 12/1978 | France |
| 2539548 | 7/1984 | France |
| 2062937 | 5/1981 | United Kingdom |

*Primary Examiner*—Daniel D. Wasil
*Attorney, Agent, or Firm*—Ronald P. Kananen; John H. Mulholland

[57] ABSTRACT

A retainer is for retaining a grid on a fuel assembly. The retainer has at least one aperture at one end thereof for receiving a shoulder on a guide control tube and legs on the other end thereof for welding to the grid. The one end of the retainer is captured between the shoulder and a surface on the bottom nozzle of the fuel assembly when the guide tube is attached to the bottom nozzle. The retainer reduces the rotation of the guide tube resulting from torquing of the screws which connect the guide tube to the bottom nozzle thereby increasing the integrity of the assembly.

16 Claims, 5 Drawing Sheets

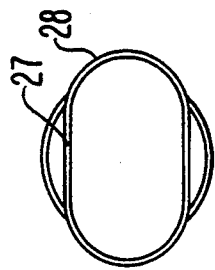
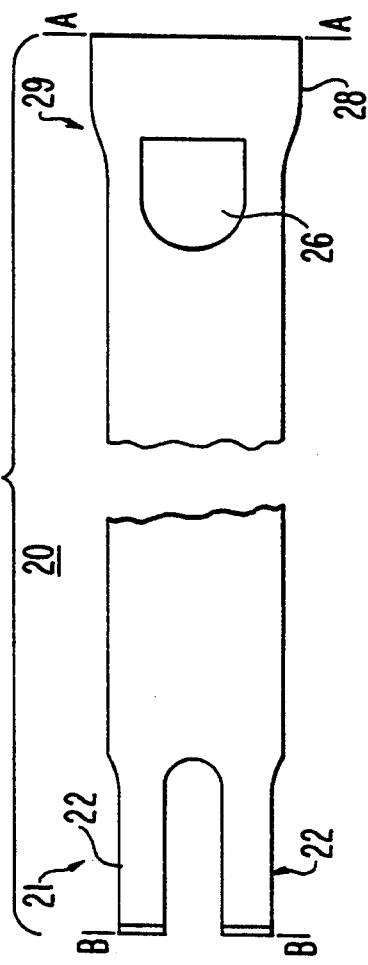
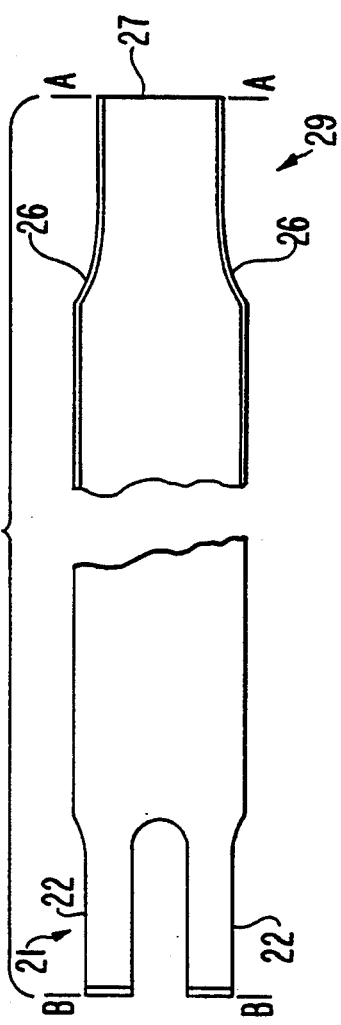
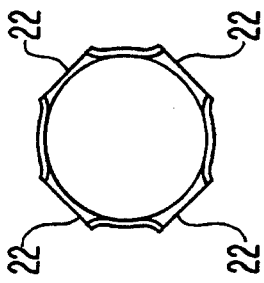

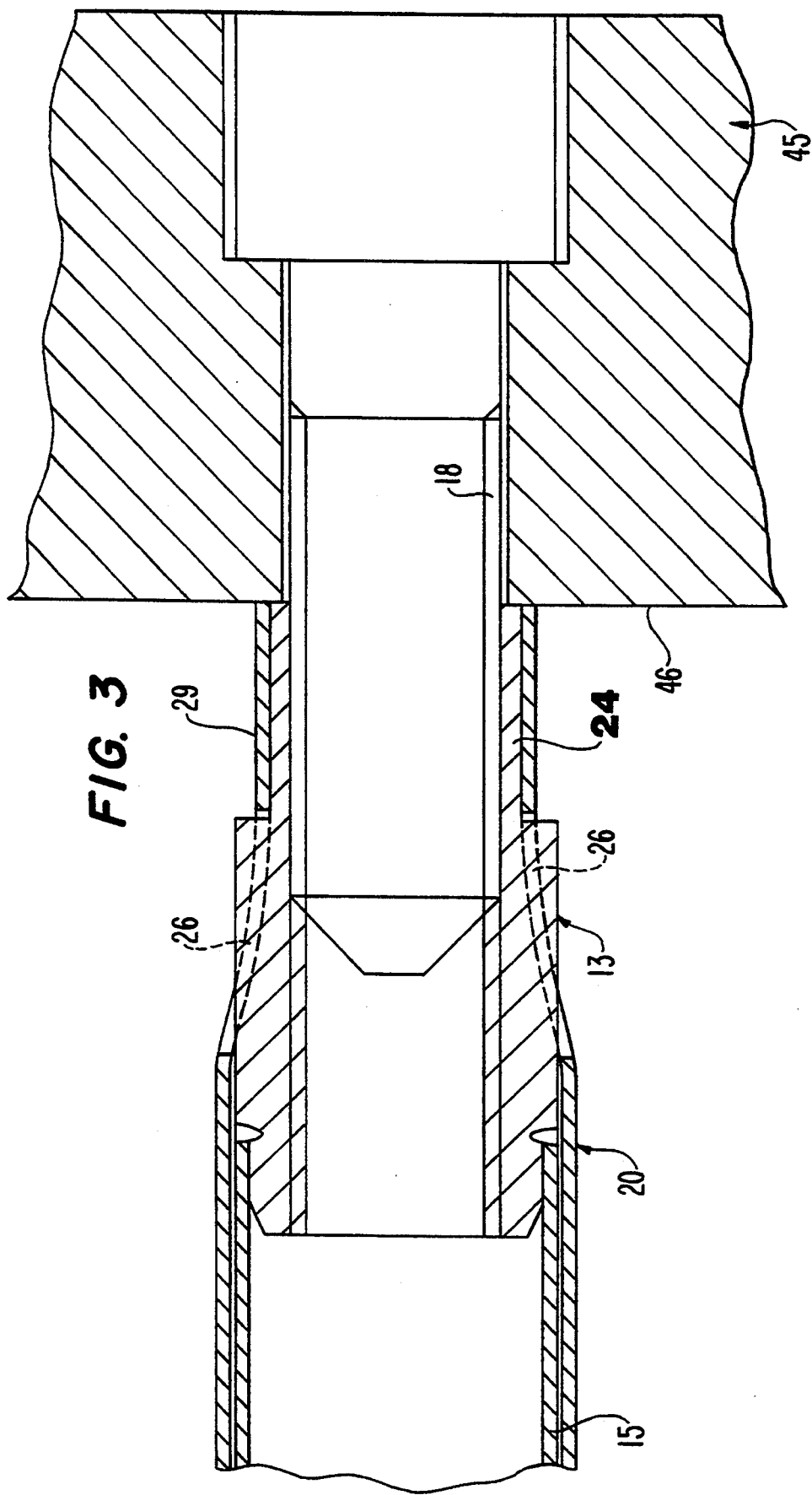

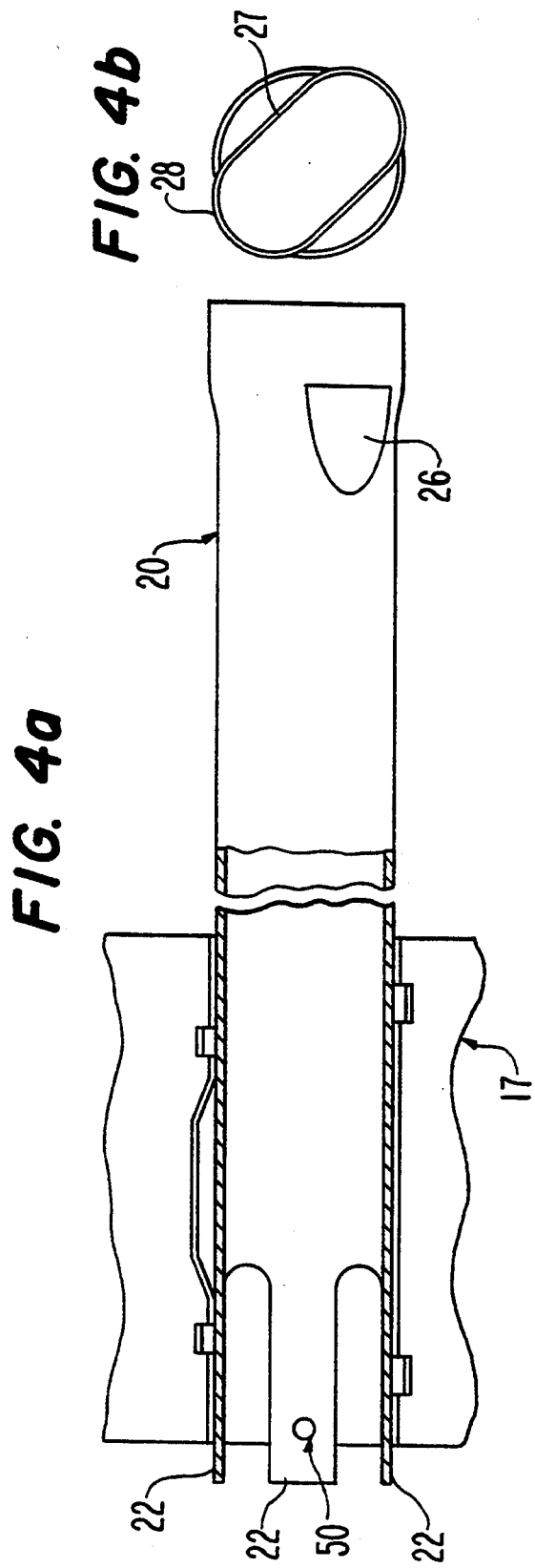

SPACER GRID RETAINER

FIELD OF THE INVENTION

This invention relates to a nuclear reactor fuel assembly and, more particularly, to a nuclear reactor fuel assembly skeleton structure and, still more particularly, to a device which retains a nuclear fuel rod spacer grid on a fuel assembly.

BACKGROUND OF THE INVENTION

Commercial nuclear reactors used for generating electric power include a core composed of a multitude of fuel assemblies which generate heat used for electric power generation purposes. Each fuel assembly includes an array of fuel rods and control rod guide tubes held in spaced relationship with each other by grids of "egg-crate" configuration spaced along the fuel assembly length.

The grids are generally of a first and second plurality of half-slotted Inconel or Zircaloy straps in egg-crate configuration and are spaced along the fuel assembly to provide support for the fuel rods, maintain fuel rod spacing, promote mixing of coolant, provide lateral support and positioning for control assembly guide tubes and provide lateral support and positioning for an instrumentation tube.

The grids along with the control assembly guide tubes and the top and the bottom nozzles form what is known as the skeleton of the fuel assembly. Typically, the guide tubes are screwed into the top and bottom nozzles, the multiple Zircaloy spacer grids are welded to the guide tubes, and the Inconel grid is mechanically attached to the bottom nozzle or guide tube. There is the problem, however, that the skeleton twists from the torquing of the screws as the guide tubes are fastened to the bottom nozzle reducing the straightness of the skeleton. Previously, attaching the Inconel spacer grid to the guide tubes has required complicated machined or welded components which are costly. Thus, it is a problem in the prior art to reliably and economically increase the integrity of the skeleton assembly.

SUMMARY OF THE INVENTION

It is an object of the present invention to economically provide a device for reliably retaining a spacer grid on a fuel assembly.

It is a further object of the present invention to increase the integrity of a nuclear reactor fuel assembly skeleton structure.

It is a further object of the present invention to provide a device which reduces the twisting of the fuel assembly skeleton resulting from torquing of the screws which connect the bottom nozzle to the guide tubes.

It is a further object of the present invention to provide a simple, low cost device to replace more complicated machined and/or welded components to retain a spacer grid on a fuel assembly.

Additional objects, advantages and novel features of the invention will be set forth in the description which follows, and will become apparent to those skilled in the art upon reading this description or practicing the invention. The objects and advantages of the invention may be realized and attained by the invention of appended claims.

To achieve the foregoing and other objects, in accordance with the present invention, as embodied and broadly described herein in a nuclear reactor fuel assembly having top and bottom nozzles and nuclear fuel rod spacer grids therebetween for supporting at least one nuclear fuel rod and at least one guide tube fastened to the top and bottom nozzles, a device is for retaining a nuclear fuel rod spacer grid on the guide tube and on the top and bottom nozzles. The tubular retainer means has a first end and a second end and a lumen extending longitudinally therethrough. The retainer means has an upper portion located at the first end for retaining the spacer grid and a lower portion located at the second end for retaining at least one of the guide tubes. The lower portion has an aperture communicating with the lumen whereby the guide tube is inserted through the lumen of the retainer means and a shoulder portion on the guide tube extends through the aperture to retain the lower portion of the retainer means between the shoulder of the guide tube and a surface of the bottom nozzle when the guide tube is attached to the nozzle thereby retaining the spacer grid on the guide tube and bottom nozzle.

BRIEF DESCRIPTION OF THE DRAWING

The accompanying drawings, which are incorporated in, and form a part of, the specification, illustrate an embodiment of the present invention and, together with the description serve to explain the principles of the invention. In the drawings:

FIG. 2a and 2b are side views of the retainer of the present invention.

FIG. 2c and 2d are cross-sectional views of the opposite ends of the retainer of the present invention taken along lines A—A and B—B in FIGS. 2a and 2b.

FIG. 3 is a side view illustrating the relationship of the retainer of the present invention to the guide tube and bottom nozzle.

FIG. 4a is an side view illustrating the relationship of the retainer of the present invention to the bottom spacer grid.

FIG. 4b is a cross-sectional view of the retainer of FIG. 4a taken along line C—C.

DETAIL DESCRIPTION

Figure 1:
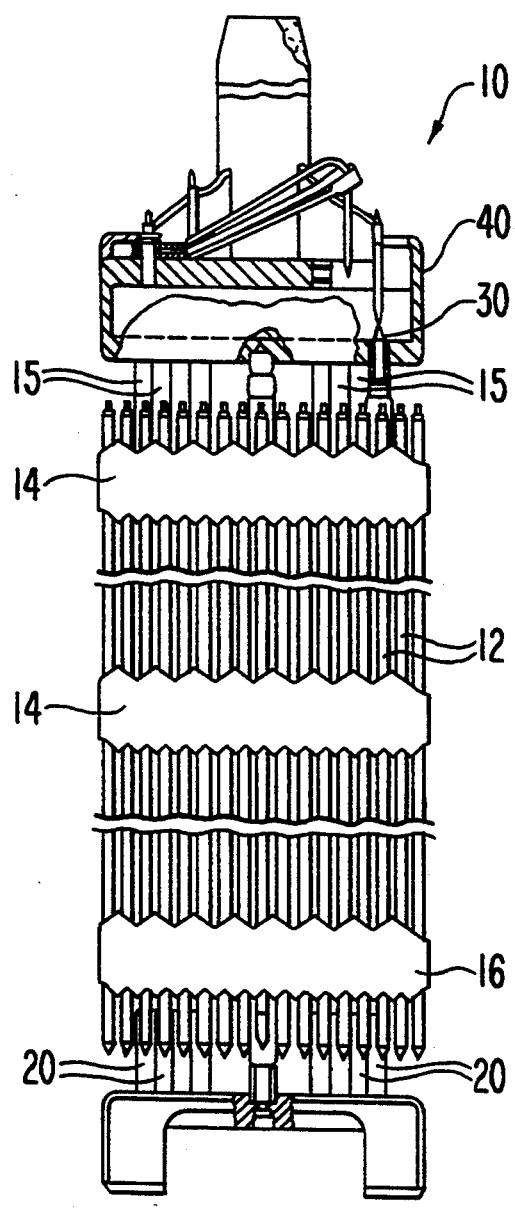
FIG. 1 is side view illustrating the relationship of the retainer of the present invention to the spacer grids, guide tubes and the other components in the assembly.

Referring now to the drawings there is shown in FIG. 1 a nuclear reactor fuel assembly 10 comprising an array of fuel rods 12 held in spaced relationship with each other by fuel rod spacer grids 14 and 16 spaced along the fuel assembly length. The grid assembly includes upper spacer grids 14 and a lower spacer grid 16. Each fuel rod 12 comprises a hermetically sealed elongated tube, known in the art as the cladding, which contains a fissionable fuel material, such as uranium, in the form of pellets. The individual fuel rods 12 are supported in the fuel assembly by means of the spacer grids 14 and 16, such that an upwardly flowing liquid coolant may pass along the fuel rods and thereby prevent overheating and possible melting of the cladding. In a manner well-known in the art, the coolant, after passing through the reactor core and being heated through contact with the fuel rods, will be delivered to a heat exchanger and the heat extracted from the circulating coolant will be employed to generate steam for driving a turbine.

The fuel assembly 10 also includes an array of guide tubes 15, having control rods 30 adapted for slidable longitudinal movement therein, which are positioned to extend axially through selected cells in spacer grids 14 and 16. The control rods 30 serve as means for regulating the thermal output power of the reactor.

Each spacer grid 14 and 16 includes straps made of a material such as Inconel or other material, interwoven to form two separate grid sections of egg-crate configurations. The openings formed are virtually aligned to form cells, and are of a sufficient size to receive fuel rods 12 or guide tubes 15.

Guide tubes 15 are attached to a top nozzle 40 and a bottom nozzle 45 by means of screws or some other affixing means and, along with the spacer grids 14 and 16, form the fuel assembly skeleton structure. The spacer grids 14 are attached to the guide tubes 15 by conventional means such as spot welding. The bottom spacer grid 16 is attached to the guide tubes 15 by a retaining means which is preferably retainer 20.

The retainer 20 will be described in more detail with reference to FIGS. 2a, 2b, 2c, 2d, 3, 4a and 4b. FIGS. 2a and 2b show two side views of retainer 20 rotated ninety degrees from each other. The retainer 20 is preferably made by stamping or forming an Inconel or stainless steel tube, but it is recognized that other materials and processes could be used.

The retainer 20 includes an upper end 21 for receiving the lower end 17 of the bottom spacer grid 16 and a lower end 29 for receiving the lower end of the guide tubes 15. The upper end 21 of retainer 20 has four leg portions 22 which are fastened to the lower end 17 of the bottom spacer grid 16, preferably by such means as spot welding as shown at 50 in FIG. 4a. FIG. 2d shows a cross-sectional view of the retainer 20 in FIG. 2a.

The lower portion 29 of the retainer 20 has an enlarged section 28, a flattened section 27 and two apertures 26. FIG. 2c illustrates the cross-sectional view of the lower portion 29 taken along line A—A.

As shown in FIG. 3, the lower end of each guide tube 15 is machined and welded to an end plug 24 to mate with the lower portion 29 of the retainer 20. The end plug 24 of each guide tube 15 has a shoulder portion 13 for mating with the retainer 20.

The apertures 26 receive the shoulder 13 of end plug 24. The flattened sectioned 27 mates with the end plug 24 and the enlarged portion 28 is captured between a top surface 46 of the bottom nozzle 45 and the shoulder 13 of end plug 24 so as to axially constrain movement of the retainer 20.

Figure 5:
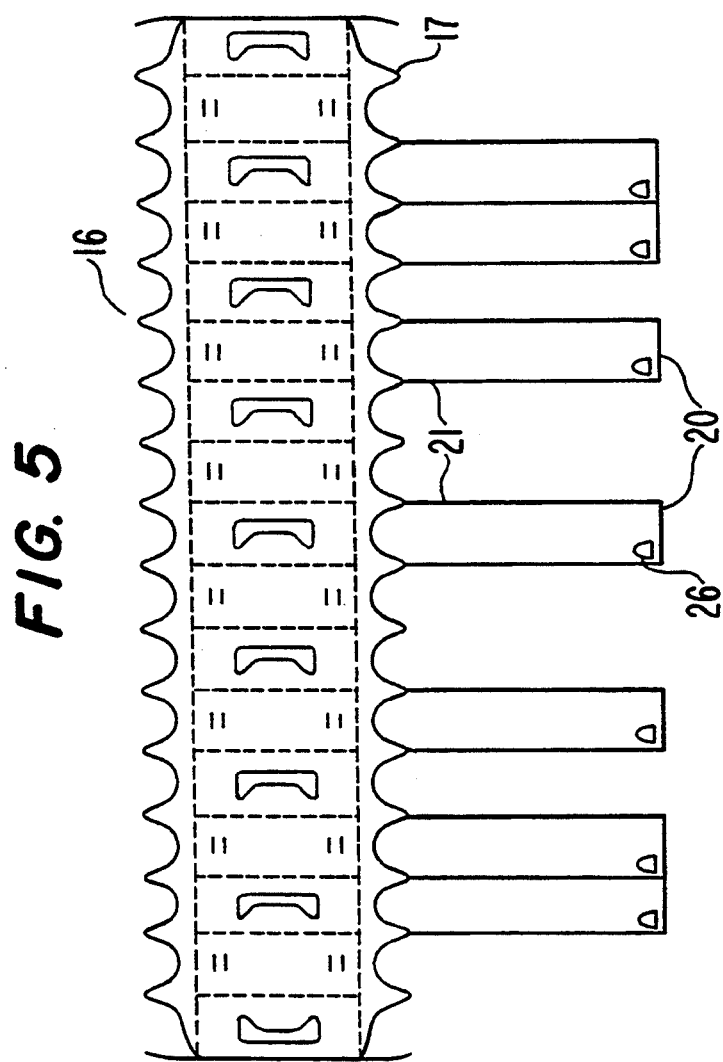
FIG. 5 is a side view of the bottom spacer grid with attached retainers.

Assembly of the skeleton structure will now be described. The legs 22 of the retainer 20 are welded to selected lower end sections 17 of the bottom spacer grid 16 such that each spacer grid cell which will later contain a guide tube 15 is attached to a retainer 20. FIG. 5 illustrates the bottom spacer grid 16 with attached retainers 20. The grid 16 is then clamped during assembly of the skeleton structure.

The guide tubes 15 are attached to the top nozzle 40 in the conventional manner, or, alternatively, by means of the retainers 20 of the present invention. The guide tubes 15 pass through the selected sections of lower end 17 of spacer grid 16 and through the retainers 20. The shoulders 13 of the end plugs 24 protrude from the apertures 26 of the retainer 20. End plugs 24 are then attached to the bottom nozzle 45 by means such as attachment screws 18. The lower section 29 of the retainer 20 is thereby captured between the surface 46 of bottom nozzle 45 and shoulder 13 of end plug 24 and axial movement is thereby constrained.

Since the grid 16 is clamped during skeleton fabrication, and each retainer 20 is welded to the spacer grid 16, the guide tubes 15 are restrained from rotating during torquing of the attachment screws which connect the bottom nozzle 45 to the guide tubes 15. The twisting of the skeleton is thereby minimized and the integrity of the skeleton increased while maintaining a strong and secure connection between the spacer grid 17, guide tubes 15 and bottom nozzles 45. Further, the retainers of the present invention are economical to produce and thereby provide a low cost means to increase the integrity of the skeleton structure.

I claim:

1. In a nuclear reactor fuel assembly having top and bottom nozzles and nuclear fuel rod spacer grids therebetween for supporting at least one nuclear fuel rod and at least one guide tube fastened to the top and bottom nozzles, a device for retaining a nuclear fuel rod spacer grid on the guide tube and the top and bottom nozzles comprising:

a tubular retainer means having a first end and a second end and a lumen extending longitudinally therethrough;

said retainer means having an upper portion located at said first end for retaining said spacer grid, and a lower portion located at said second end for retaining at least one of said guide tubes;

said lower portion having an aperture communicating with said lumen whereby said guide tube is inserted through said lumen of said retainer means and a shoulder portion on said guide tube extends through said aperture to retain said lower portion of said retainer means between the shoulder of said guide tube and a surface of said bottom nozzle when said guide tube is attached to said nozzle, thereby retaining said spacer grid on said guide tube and bottom nozzle, said lower portion having a flattened portion and an enlarged portion, said flattened portion mating with the guide tube, and said enlarged portion being retained between the shoulder portion and a surface of said bottom nozzle.

2. The device according to claim 1 wherein said upper portion comprises a plurality of leg segments.

3. The device according to claim 2 wherein said legs retain said spacer grid by means of spot welding.

4. The device according to claim 4 wherein said plurality of legs is four legs.

5. The device according to claim 2 wherein said lower portion has two flattened sections opposite each other and two enlarged sections interposed there between.

6. The device according to claim 6 wherein said aperture comprises two apertures located one each on said flattened sections.

7. The device according to claim 2 wherein said retaining means is made from Inconel.

8. The device according to claim 2 wherein said retaining means is made from steel.

9. A skeleton structure for a nuclear reactor fuel assembly comprising in combination:

a bottom nozzle;

at least one guide tube wherein a lower end of said guide tube has an attachment portion for attachment to said bottom nozzle and a shoulder positioned between the attachment portion and an upper end of said guide tube;

a spacer grid assembly for supporting at least one nuclear fuel rod and said at least one guide tube;

a tubular retaining means having a first end and a second end wherein said first end retains said spacer grid and said second end has an aperture for receiving and retaining said shoulder of said guide tube; and a top nozzle for attachment to an upper portion of said guide tube, wherein said second end of said tubular retaining means has a flattened portion and an enlarged portion, said flattened portion mates with said guide and said enlarged portion is retained between said shoulder and a surface of said bottom nozzle.

10. The device according to claim 9 wherein said first end comprises a plurality of leg segments.

11. The device according to claim 10 wherein said legs retain said spacer grid by means of spot welding.

12. The device according to claim 11 wherein said plurality of legs is four legs.

13. The device according to claim 9 wherein said second end has two flattened sections opposite each other and two enlarged sections interposed therebetween.

14. The device according to claim 13 wherein said aperture comprises two apertures located one each on said flattened sections.

15. The device according to claim 9 wherein said retaining means is made from Inconel.

16. The device according to claim 7 wherein said retaining means is made from steel.

* * * * *